(12) United States Patent
Carter

(10) Patent No.: US 10,639,568 B1
(45) Date of Patent: May 5, 2020

(54) PIPE GUARD

(71) Applicant: Allen Roy Carter, Robertsville, MO (US)

(72) Inventor: Allen Roy Carter, Robertsville, MO (US)

( * ) Notice: Subject to any disclaimer, the term of this patent is extended or adjusted under 35 U.S.C. 154(b) by 350 days.

(21) Appl. No.: 15/621,131

(22) Filed: Jun. 13, 2017

(51) Int. Cl.
*B01D 35/02* (2006.01)
*E03F 5/10* (2006.01)
*E03F 5/14* (2006.01)

(52) U.S. Cl.
CPC .............. *B01D 35/02* (2013.01); *E03F 5/105* (2013.01); *E03F 5/14* (2013.01)

(58) Field of Classification Search
None
See application file for complete search history.

(56) References Cited

U.S. PATENT DOCUMENTS

| | | |
|---|---|---|
| 644,262 A | 2/1900 | Stair |
| 929,514 A | 7/1909 | Tenold |
| 961,834 A | 6/1910 | Bartlett |
| 972,378 A | 10/1910 | Hammett |
| 999,106 A | 7/1911 | Hagaman |
| 1,371,143 A | 3/1921 | Bradburn |
| 1,504,233 A | 8/1924 | Graham |
| 1,793,599 A | 2/1931 | Egan |
| 2,285,833 A | 6/1942 | Platt |
| 2,669,358 A | 2/1954 | Young |
| 3,086,655 A | 4/1963 | Compton |
| 3,392,844 A | 7/1968 | Decarie |
| 3,398,830 A | 8/1968 | Hornquist |
| 4,174,913 A | 11/1979 | Schliesser |
| 4,205,707 A | 6/1980 | Lundgren |
| 4,419,232 A | 12/1983 | Arntyr et al. |
| 4,702,828 A | 10/1987 | Mehmert et al. |
| 4,996,725 A | 3/1991 | Pino |
| 5,102,537 A | 4/1992 | Jones |
| 5,452,546 A | 9/1995 | Goddard |
| 5,581,934 A | 12/1996 | Arnold, Sr. |
| 5,744,048 A * | 4/1998 | Stetler .................. E03F 5/0401 210/164 |
| 5,866,218 A | 2/1999 | Meuth |
| 6,086,758 A | 7/2000 | Schilling et al. |
| 6,092,244 A * | 7/2000 | Rizzardi .................. E03F 5/06 138/89 |
| 6,780,310 B1 * | 8/2004 | Howe .................... B01D 17/00 210/155 |

(Continued)

*Primary Examiner* — Jonathan M Peo
(74) *Attorney, Agent, or Firm* — Creativenture Law, LLC; Dennis JM Donahue, III; Kevin C. Staed

(57) ABSTRACT

The invention described is a pipe guard that prevents unwanted debris from entering a pipe while still allowing the flow of water. The pipe guard includes braces connecting a mounting flange on the outside of the pipe to a plate within the pipe having a plurality of holes. A bracket extends from one brace to the other between the flange and plate to provide additional support and rigidity to the pipe guard as well as acting as a handle that can be grasped by a worker to remove the pipe guard and material that may build up on the plate. The pipe guard is secured within the pipe by fasteners that extend through threaded holes in the braces and partially embed into the interior wall of the pipe. Accordingly, the pipe guard cannot be pulled free from or knocked loose from the pipe without loosening the screws.

20 Claims, 3 Drawing Sheets

(56) References Cited

U.S. PATENT DOCUMENTS

| | | |
|---|---|---|
| 8,679,329 B2 | 3/2014 | Vreeland |
| 8,926,836 B2 | 1/2015 | Takai |
| 2003/0147693 A1* | 8/2003 | Knak .................. E03F 5/06 404/4 |
| 2014/0054245 A1 | 2/2014 | Loesche |

* cited by examiner

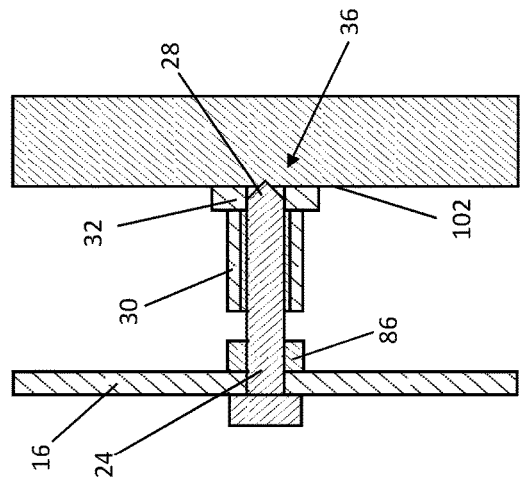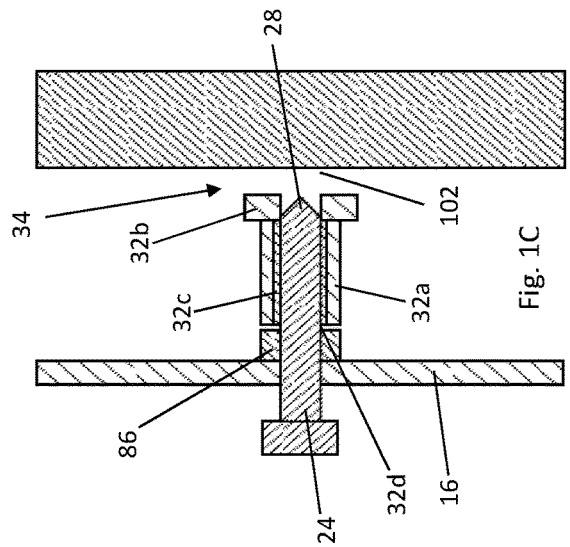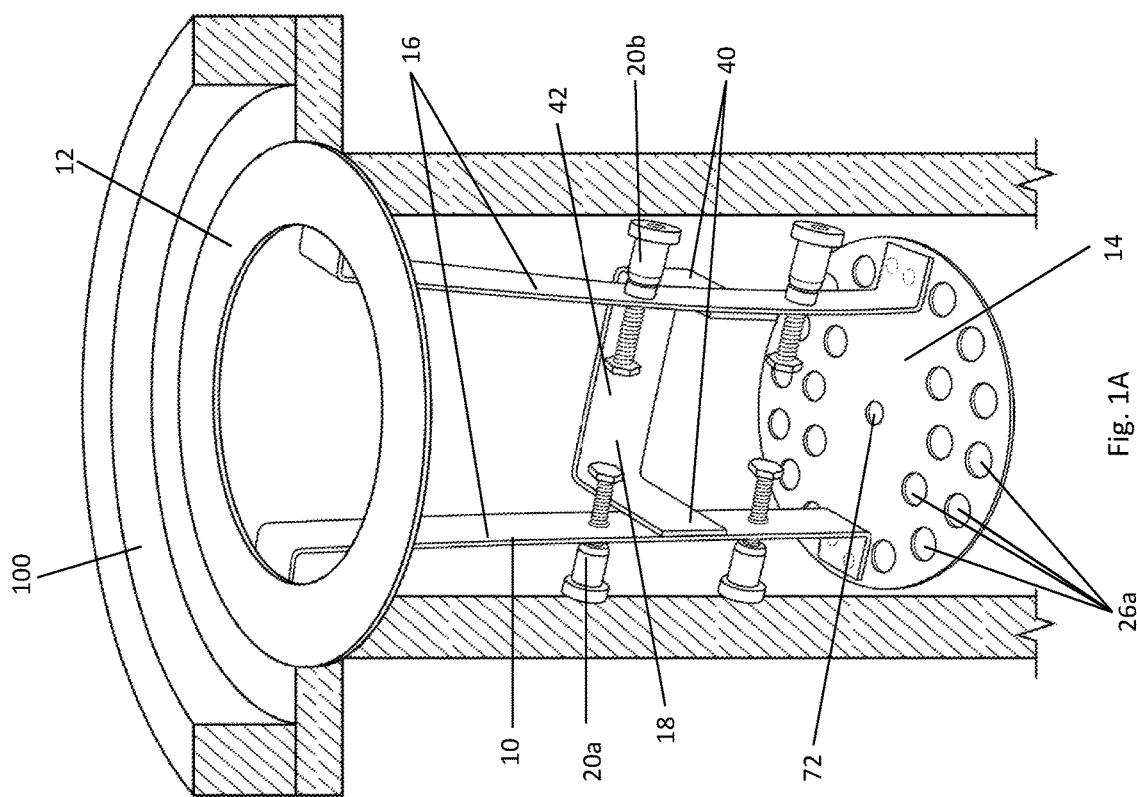

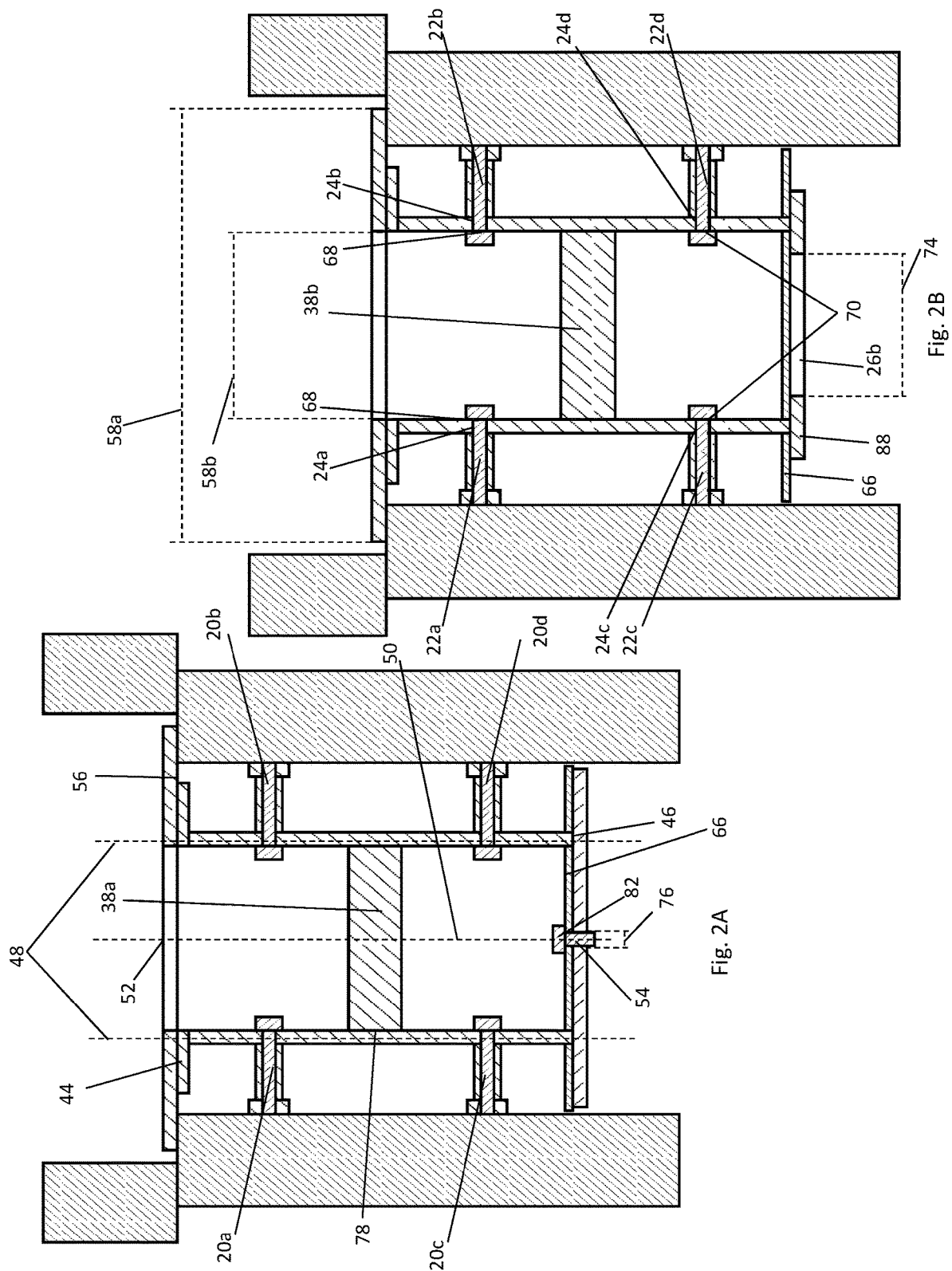

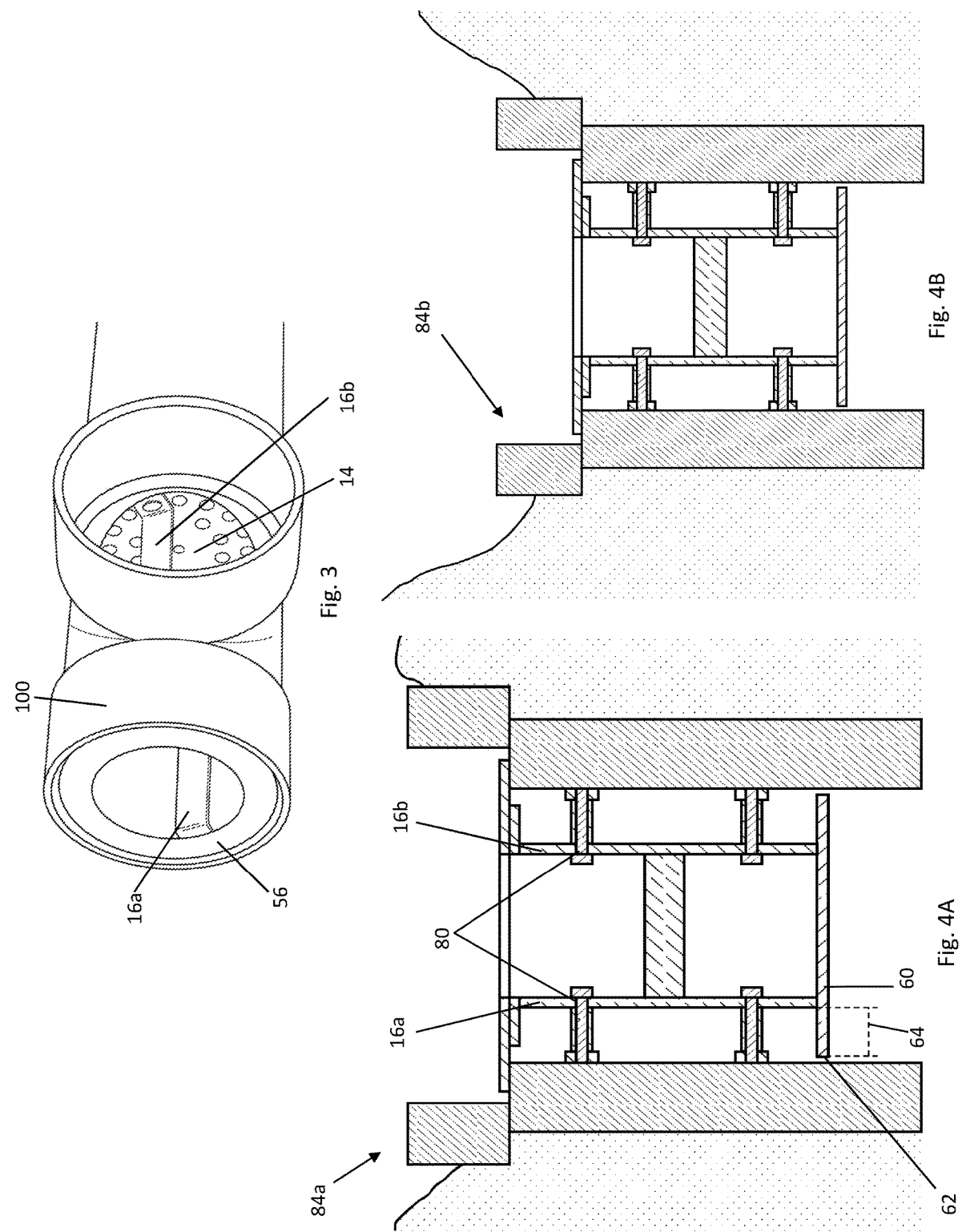

PIPE GUARD

CROSS-REFERENCE TO RELATED APPLICATIONS

This application is an original filing of the invention as a non-provisional patent application and does not claim a right of priority to any other application or the benefit of an earlier filing date.

STATEMENT REGARDING FEDERALLY SPONSORED RESEARCH

Not Applicable.

APPENDIX

Not Applicable.

BACKGROUND OF THE INVENTION

Field of the Invention

The present invention relates to pipe guards, and more particularly to pipe guards that are removably secured in drainage pipes and allow the flow of water while preventing unwanted debris from entering the pipe.

Related Art

It has long been a desire to those having skill in the art to have a pipe system that efficiently permits water flow while preventing unwanted foreign objects from entering drainage pipes. Whether the drainage pipe is a main sewer line, clean out pipe, vent pipe, drain pipe or otherwise, it is desirable to allow constant water flow while preventing unwanted debris from entering the pipe. Prior art pipe guards attempt to solve this problem through caps and grates positioned in or around an end of a pipe with a grated or screened section having holes that are large enough to allow water through but small enough to prevent large debris from entering the pipe. However, a problem exists as these traditional pipe caps and grates can be easily removed as well us unintentionally knocked lose, thereby being ineffective at keeping unwanted debris out of the pipe. Accordingly, there is a desire to those having skill in the art for a pipe guard that can be removably secured within the interior of the pipe which cannot be easily removed or unintentionally knocked lose as seen in the prior art pipe caps and grates.

Although drainage pipes can become plugged through general use as drainage water washes debris towards the drainage pipe, pipes also become plugged when rock, dirt or other debris accidently fall into the pipes during installation or routine maintenance. When this occurs, it may take workers multiple hours to unclog the pipe, ultimately costing time and money. Additionally, an improved pipe guard will save workers substantial time and money as it is not uncommon for large objects to fall down sewer lines and become permanently wedged within the pipe. Accordingly, the large object cannot be removed and the entire pipe or a section thereof must be replaced to prevent the clogged pipe from causing flooding.

Additionally, drainage pipes and prior art guards may periodically become buried from cave-ins during repair or through the natural overflowing of dirt, grass and other debris. Thus, there is a desire to those having skill in the art for a pipe guard made of sturdy materials, like stainless steel, that can withstand being buried without being destroyed and rendered ineffective as may happen with less sturdy materials like plastic or similar materials. Further, pipe and pipe guards that are buried can be difficult to locate so there is an added benefit to a stainless steel pipe guard which can be located with a metal detector. Of course, this feature is even more beneficial if the pipe guard remains in the pipe when buried as both the guard and pipe can be found together. This is particularly useful if the pipe itself is made from clay or plastic and cannot be readily found with a metal detector. Accordingly, there is another desire in the art to have pipe guards that are securely fastened within a pipe and are not easily dislodged when buried as may tend to happen with prior art caps and grates that merely rest on top of the pipe.

SUMMARY OF THE INVENTION

A guard for a drainage pipe having a mounting flange that rests on the outer portion of the pipe and a plate that sits within the pipe and is attached to the flange by a pair of braces. The braces are attached to one another by a bracket that is substantially perpendicular to the longitudinal axis of the brace and is substantially equidistant from the flange and the plate. The plate has a plurality of holes that are large enough to allow water to freely flow through the plate while still being small enough to prevent unwanted debris from entering the pipe. Accordingly, the majority of the pipe guard rests within the interior portion of an end of the pipe with only the flange extending therefrom as it rests circumferentially around the opening of the pipe.

In another aspect of the pipe guard, the braces are made up of threaded holes, screws and expanding nuts that engage the interior portion of the pipe and thereby secure the pipe guard therein. In operation, the pointed tips of the screws embed into the interior wall of the pipe and the expansion screws seal against the interior sidewall around the screw tip and create a more secure connection. In the preferred embodiment the hole in the brace is threaded and there is also a threaded nut mounted around the hole in the brace on the brace wall nearest the interior wall of the pipe. However, other embodiments may not have the threaded nut and need only have a threaded brace hole.

In another aspect of the pipe guard the screws may not be used at all, such as when the pipes are being worked on and a worker merely wants to temporally guard a portion of the pipe but does not necessarily need to securely hold the pipe guard therein for an extended period of time. Accordingly, a worker may insert the pipe guard into the pipe without engaging the screws into the interior of the pipe and the pipe guard can be quickly removed once work is completed.

In another aspect of the pipe guard, a screen may also be mounted to the plate to prevent the flow of smaller material that might pass unobstructed through the larger apertures in the plate. In this embodiment the screen can be mounted directly on top of the plate and may rest thereon or may be secured to the plate by a screw or similar fastener through a center mounting hole in the plate.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings. The drawings constitute a part of this specification and include exemplary embodiments of the invention, which may be embodied in various forms. It is to be understood that in some instances, various aspects of the invention may be shown exaggerated or enlarged to facilitate an understanding of the invention; therefore the drawings are not necessarily to scale. In addition, in the embodiments depicted herein, like reference numerals in the various drawings refer to identical or near identical structural elements.

FIG. 1A is an isometric view of the pipe guard.

FIGS. 1B and 1C are detail cross-sectional views of the screw, expansion nut and threaded nut respectively engaged with and disengaged from the interior wall of the pipe.

FIG. 2A is a cross-sectional view of the pipe guard in an alternative embodiment with a screen secured to the plate by a fastener.

FIG. 2B is a cross-sectional view of the pipe guard in an alternative embodiment with a single plate aperture and screen thereon.

FIG. 3 is a perspective view of the pipe guard in a pipe.

FIG. 4A is a cross-sectional view of the pipe guard in a pipe above grade.

FIG. 4B is a cross-sectional view of the pipe guard in a pipe below grade.

DETAILED DESCRIPTION OF THE PREFERRED EMBODIMENTS

The following description of the preferred embodiment(s) is merely exemplary in nature and is in no way intended to limit the invention, its application, or uses.

A pipe guard 10 to prevent unwanted debris from entering a drainage or similar pipe 100 while still allowing the flow of water through the pipe. The pipe guard has a mounting flange 12 that sits against the lip of the pipe and a pair of braces 16 that extend from the mounting flange into the pipe. At the end of the braces opposite from the flange is a plate 14 having a plurality of holes 26a large enough to allow the flow of water but small enough to prevent unwanted debris from entering the pipe. Additionally, a bracket 18 extends from one brace to the other between the flange and plate providing additional support and rigidity to the pipe guard as well as acting as a handle that can be grasped by a worker to remove the pipe guard and material that may build up on the plate. In the preferred embodiment the pipe guard is secured within the pipe by screws 22 and expansion nuts 32 that extend through a threaded hole 24 in the brace and slightly embed into the interior wall 102 of the pipe. Accordingly, the pipe guard cannot be pulled free from or knocked loose from the pipe without a worker first loosening the screws. In an alternative embodiment, for example when the pipe is being worked on and there is no need to securely fasten the pipe guard within the pipe, the screws may not be engaged and the pipe guard will still block unwanted debris from entering the pipe.

The pipe guard is preferably made from stainless steel to prevent rust and corrosion as well as to provide sufficient strength and rigidity. Additionally, it is not uncommon for pipes and pipe guards to become buried either from cave-ins as the pipes are being worked on or from general back-up of material flowing towards the pipe. Accordingly, the preferred stainless steel material of the pipe guard allows a worker to quickly find the pipe and pipe guard with a metal detector should the pipe and pipe guard become buried. Further, the stainless steel construction prevents the pipe guard from being damaged or destroyed in the event of a cave-in as well as extending the lifetime of the pipe guard which may be subject to wear and tear during general use.

The pipe guard is made up of the mounting flange connected to a pair of braces at their proximal end 44 which are also connected to a plate at their distal end 46. The plate has a plurality of apertures through which water may pass while preventing the flow of unwanted debris into the pipe and has a diameter slightly smaller than the diameter of the pipe. The braces themselves are spaced apart from each other on opposite sides of the mounting flange and plate. Accordingly, the braces have a longitudinal axis 48 that is parallel with the central axis 50 of the center of the circular flange 52 and center of the plate 54.

Another aspect of the pipe guard is the bracket spanning between and connecting the pair of braces at a point 78 between the flange and plate, substantially perpendicular to the longitudinal axis of the braces as shown in FIG. 2A. The bracket also acts as a handle and in the preferred embodiment is either a u-shaped 38a bracket or a c-shaped 38b bracket that may substantially match the curvature of the pipe in which the pipe guard is fit. The bracket has a center section 42 that is intended to be grasped by the worker and a pair of legs 40 that attach to the pair of braces shown in FIG. 1A. As the bracket is preferably u-shaped or c-shaped, the center section does not pass through the central axis of the flange and plate but instead skirts around the central axis to allow space for a worker to fully insert their hand and/or tool to tighten or loosen the fasteners described below. The center section of the bracket being positioned away from the central axis grants a worker sufficient room to grasp the handle and pull the pipe guard and debris from the pipe. Accordingly, the bracket is the only element connecting the pair of braces between the flange and the plate as it provides sufficient rigidity and permits ample space for worker access.

Another aspect of the pipe guard are the fasteners 20 used to removably secure the pipe guard within the pipe, shown in detail in FIGS. 1B and 1C. In the preferred embodiment, fasteners are pointed screws 22a, 22b, 22c & 22d and expansion nuts used where the tip of the screw engages and slightly embeds into the interior wall of the pipe while the expansion nut contacts the interior wall around the embedded tip, thereby providing a larger surface area and more secure connection when the screw engages the pipe wall. The expansion nut is preferably flexible and deforms to the shape of the pipe wall as the tip of the screw is tightened and further embeds itself. In operation, the screw is slightly recessed into the expansion nut in a first position 34 and disengaged from the pipe wall as shown in FIG. 1C. In a second position 36 the tip of the screw is slightly extended from the expansion nut and engages the pipe wall. In the preferred embodiment, the screw is recessed ⅛ of an inch in the first position which is less than the diameter of the screw and extends from the expansion nut in the second position a distance that is even less than the recess. Also known as a well nut, the preferred expansion nut is made of a rubber outer sleeve having a sleeve flange 32b and plug 32a with a threaded insert 32c within the plug's interior cavity which extends entirely through the plug. Additionally, the sleeve flange has an orifice 32d aligned with the threaded insert through which the screw extends. It will be appreciated that while an expansion nut is the preferred cap on the end of the screw, a flanged grommet 30 may be used, with or without a threaded insert.

During tightening, the screw remains recessed in the expansion nut and the screw spins through a threaded nut 86 attached to the brace as depicted in FIG. 1B. Similarly, the screw is threaded through the threaded insert of the expansion nut which also spins as a worker tightens the screw until the sleeve flange comes into contact with the pipe wall and the expansion nut becomes wedged between the threaded nut mounted to the brace and the pipe wall. Accordingly, the sleeve flange deforms to the curvature of the sidewall and the expansion nut remains immovably wedged whereas the screw continues to spin through the threaded nut and threaded insert of the expansion nut until the tip slightly extends through the flange orifice and embeds into the sidewall of the pipe as depicted in FIG. 1B.

Although a standard threaded screw with a tapered tip 28 is used in the preferred embodiment, other similar types of fasteners may be used. In addition to the threaded screw, the expansion nut forms a sleeve around the screw and deforms to fit flush against the interior wall of the pipe and thereby provides additional contact surface area as described above. In the preferred embodiment this expansion nut is made of rubber with a metal threaded insert but other similar materials that are capable of deforming to the curvature of the pipe wall may be used. Additionally, a threaded nut is preferably mounted around a hole in the brace. As shown in FIG. 1B, the threaded nut is welded onto the pipe-wall-side of the brace and the fastener is threaded there through and into the threaded insert of the expansion nut. However, in an alternative embodiment the threaded nut may not be attached around the threaded brace hole where the screw is simply threaded through the brace hole and the threaded insert of the expansion nut. Accordingly, the expansion nut becomes wedged between the brace and the pipe wall rather than between the threaded nut and the pipe wall. Regardless, the tip of the screw still extends from the sleeve flange orifice and embeds into the sidewall of the pipe and the sleeve flange provides additional contact surface area for a more secure fit.

Accordingly, a worker tightens the fastener into the pipe wall until the pipe guard is secure and subsequently the worker must loosen the fasteners to remove the pipe guard. Thus, the pipe guard cannot be unintentionally knocked free from the pipe and rendered ineffective. The fasteners also aid in centering the pipe guard within the pipe and prevent it from shifting therein. However, the pipe guard will still effectively prevent unwanted debris from entering a pipe even if the fasteners are not used. For example, it may be easier for a worker to quickly insert the pipe guard into a portion of a pipe that is being repaired without fastening the screws where the pipe need only be protected for a short period of time during maintenance or repair. Accordingly, the pipe guard will still function as intended even if the fasteners are not used it will just be easier for the pipe guard to be removed, either intentionally or unintentionally, and thus this embodiment is only preferred when the pipe need only be guarded for short periods of time.

In the preferred embodiment there are multiple fasteners positioned along each brace 16a & 16b and at substantially opposite positions 80. Accordingly, there is preferably a first fastener 20a and second fastener 20b respectfully on opposite braces at a position 68 between the bracket and the flange in addition to a third fastener 20c and fourth fastener 20d respectfully on opposite braces at another position 70 between the bracket and the plate. Although four total fasteners are shown in the preferred embodiments depicted in the drawings, this number is not intended to be limiting and the number of total fasteners may be increased or decreased depending on how secure a worker determines they would like the pipe guard.

In another aspect of the pipe guard, the mounting flange is made up of a circular ring 56 with an outer diameter 58a and an inner diameter 58b. When the pipe guard is inserted into the pipe, the mounting flange rests against the lip of the pipe but is not necessarily connected thereto with a fastener or otherwise. Additionally, the plate is made up of a circular rigid panel 60 having a perimeter edge 62 with a plurality of apertures being formed inside the perimeter. Although the apertures may vary in size, they preferably have a diameter 74 no larger than inches in diameter as to prevent large debris from entering the pipe. Further, the braces are mounted to the plate but are radially spaced a distance 64 away from perimeter of the plate. The plate itself has a diameter slightly smaller than the diameter of the pipe allowing the plate to fit within the pipe but having a small enough gap between the perimeter edge and the pipe wall to prevent unwanted debris from entering the pipe. Accordingly, water may freely flow through the plurality of apertures on the plate and between the perimeter edge of the plate and the pipe wall.

In alternate embodiments of the pipe guard shown in FIG. 2A, the plate may also have a filtering screen 66 that allows the flow of water but prevents the flow of smaller debris. In operation, a screen having smaller holes will filter out smaller debris that would typically pass through the larger plate apertures if the screen was not used. In this embodiment, the screen may be seated on the flange-side of the plate and may simply rest thereon without being secured thereto. However, the screen may also be secured to the plate by a fastener 82 that extends through a mounting hole 72 in the plate aligned with the central axis of the plate as shown in FIG. 2A. The mounting hole also has a hole diameter 76 that is preferably smaller than the plurality of apertures on the plate. In this embodiment, the screen covers the plurality of larger holes that are in the plate and as stated will filter out finer materials. Additionally, in another embodiment shown in FIG. 2B the screen replaces the larger plate apertures all together and is simply attached across a single aperture 26b in the plate that defines a plate flange 88 or ring. In this embodiment there is only a single plate hole and the screen is the only filtering element. Although not intended to be limiting, many types of screens may be used including but not limited to grates and structural screens. As described with the mounting flange of the pipe guard, the perimeter edge of the plate with a single aperture defines an outer diameter and the diameter of the single aperture defines an inner diameter, collectively forming a plate flange. In another embodiment not shown, the grate itself could be secured by a weld or otherwise directly to the braces, replacing the plate or ring all together.

In another embodiment of the pipe guard not shown, the plate may be comprised of a cylindrical basket made of a screen, a plurality of larger apertures, or a combination of the two. In this embodiment the plate defines the bottom of a catch basket that has sidewalls extending from the plate towards the flange between the braces and the interior wall of the pipe. Additionally, the sidewalls are preferably connected to a portion of the mounting flange of the pipe guard as well as the end of the braces opposite from the mounting flange. However, the sidewalls do not necessarily need to extend the entire length of the braces and may not reach the mounting flange. Accordingly, the basket in another embodiment may only be connected to the braces at the plate. In this embodiment the entire basket, including the plate, may be formed from a single mesh screen that prevents the flow through of small debris and is cylindrically shaped to fit within the pipe, such as in U.S. Pat. No. 3,398,830 which is hereby incorporated by reference. The basket may also be formed from sheets of material that form a cylindrical basket with multiple apertures, matching the size and dimensions of the plate apertures described above. In either case, the sidewalls of the basket preferably have at least some apertures large enough to accommodate the screws and nuts as discussed above to allow for securely mounting the pipe guard within the pipe according to the present invention. Although the basket embodiment could be used for the present invention, it is not preferred because the sidewalls of the basket could snag on the sidewalls of the pipe during the insertion and removal of the pipe guard.

In operation the pipe guard is inserted in the end of a pipe until the mounting flange rests against the lip of the pipe, as shown in FIG. 3, or a portion thereof in the case of a partially broken pipe. If the pipe guard is intended to remain in the pipe for an extended period of time a worker then tightens the fasteners and the pipe guard remains in the pipe until a time when the fasteners are loosened and the pipe guard is removed. As shown in FIGS. 4A and 4B, the pipe guard can be used in any number of pipes including pipes that are above grade 84a as well as pipes that are below grade 84b. Additionally, the pipe guard can be used in pipes oriented both vertically and horizontally as the fasteners secure the guard with the pipe regardless of orientation. Further, it should be appreciated that the pipe guard described herein can be manufactured to fit any size pipe and the number of fasteners may vary as appropriate to hold the pipe guard within the pipe.

The embodiments were chosen and described to best explain the principles of the invention and its practical application to persons who are skilled in the art. As various modifications could be made to the exemplary embodiments, as described above with reference to the corresponding illustrations, without departing from the scope of the invention, it is intended that all matter contained in the foregoing description and shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. A guard for a pipe, comprising:
   a flange comprising a top side and a bottom side, wherein the bottom side contacts an opening of the pipe;
   a plate having a plurality of apertures, wherein the plate is removably positioned within the pipe;
   a pair of braces connected to the flange at a proximal end and connected to the plate at a distal end, wherein the pair of braces are spaced opposite from each other, and wherein each b one of the pair of braces comprises a longitudinal axis substantially parallel with a central axis extending through a first center of the flange and a second center of the plate; and
   a bracket connecting the pair of braces at a location between the flange and the plate, wherein the bracket is substantially perpendicular to the longitudinal axis of each one of the pair of braces, wherein only the bracket connects the pair of braces to each other between the flange and the plate, and wherein no other structure connects the pair of braces to each other between flange and the plate.

2. The guard of claim 1, further comprising:
   a first fastener connected to a first brace in the pair of braces and extending to engage the pipe; and
   a second fastener connected to a second brace in the pair of braces and extending to engage the pipe at a position between the flange and the plate and substantially opposite from the first fastener.

3. The guard of claim 2, wherein the first fastener is comprises a first screw extending through a first threaded hole in the first brace, and wherein the second fastener comprises a second screw extending through a second threaded hole in the second brace.

4. The guard of claim 3, further comprising a third fastener and a fourth fastener, wherein the third fastener comprises a third screw extending through a third threaded hole in the first brace, wherein the fourth fastener comprises a fourth screw extending through a fourth threaded hole in the second brace, wherein the first threaded hole and the second threaded hole are respectively positioned on the first brace and the second brace between the bracket and the flange, and wherein the third threaded hole and the fourth threaded hole are respectively positioned on the first brace and the second brace between the bracket and the plate.

5. The guard of claim 3, wherein each one of the first screw and the second screw comprise a tapered tip, wherein the first fastener further comprises a first grommet secured around the tapered tip of the first screw, and wherein the second fastener further comprises a second grommet secured around the tapered tip of the second screw.

6. The guard of claim 5, wherein the first grommet and the second grommet each further comprise an expansion nut, wherein the expansion nut comprises a plug, a sleeve flange at one end of the plug, and a threaded insert within a cavity extending entirely through the plug, wherein the first screw engages the threaded insert of the first grommet and the second screw engages the threaded insert of the second grommet, wherein the tapered tip of the first screw and the tapered tip of the second screw are respectively recessed within the sleeve flange of the first grommet and the second grommet in a first position, wherein the tapered tip of the first screw and the tapered tip of the second screw respectively extend out from the sleeve flange of the first grommet and the second grommet in a second position, and wherein the sleeve flange of the first grommet and the sleeve flange of the second grommet and the tapered tip of the first screw and the tapered tip of the second screw respectively engage a wall of the pipe in the second position.

7. The guard of claim 1, wherein the bracket is at least one of a u-bracket and a c-bracket, wherein the bracket comprises a pair of legs respectively connected to the pair of braces and a center section extending between the pair of legs, wherein the bracket has a lateral axis parallel to the longitudinal axis of the pair of braces and a center axis extending between the flange and the plate, and wherein the center section skirts around the central axis and does not extend through the center axis.

8. The guard of claim 1, wherein the flange further comprises a circular ring with an outer diameter and an inner diameter, wherein the braces extend from the internal diameter of the flange to the plate and no other structure connects the flange to the plate.

9. The guard of claim 1, wherein the flange further comprises a circular ring with an outer diameter and an inner diameter, wherein the bottom side circumferentially contacts the opening of the pipe, wherein the plate further comprises a circular rigid panel with the apertures formed within a perimeter of the circular rigid panel, and wherein each one of the pair of braces is spaced a distance radially inward from the perimeter of the circular rigid panel.

10. The guard of claim 1, further comprising a screen seated on the plate and a screw connecting the screen to the plate.

11. A guard for inserting into an end of a pipe and securely connecting to the interior sidewall of the pipe, comprising:
a flange comprising a top side and a bottom side, wherein the bottom side contacts an opening at the end of the pipe;
a plate having at least one aperture, wherein the plate is removably positioned within the end of the pipe;
a pair of braces connected to the flange at a proximal end and connected to the plate at a distal end, wherein the pair of braces are spaced opposite from each other, and wherein each b one of the pair of braces comprises a longitudinal axis substantially parallel with a central axis extending through a first center of the flange and a second center of the plate;
a first fastener connected to a first brace in the pair of braces and extending to engage the pipe;
a second fastener connected to a second brace in the pair of braces and extending to engage the pipe at a position between the flange and the plate and substantially opposite from the first fastener; and
a bracket connecting the pair of braces at a location between the flange and the plate, wherein the bracket is substantially perpendicular to the longitudinal axis of each one of the pair of braces.

12. The guard of claim 11, wherein the flange further comprises a circular ring with an outer diameter and an inner diameter, wherein the bottom side circumferentially contacts the opening of the end of the pipe, wherein the plate further comprises a circular rigid panel with a plurality of apertures formed within a perimeter of the circular rigid panel, and wherein each one of the pair of braces is spaced a distance radially inward from the perimeter of the circular rigid panel.

13. The guard of claim 11, further comprising a screen seated on the plate.

14. The guard of claim 11, wherein the first fastener comprises a first screw extending through a first threaded hole in the first brace, and wherein the second fastener comprises a second screw extending through a second threaded hole in the second brace.

15. The guard of claim 14, wherein each of the first screw and the second screw further comprise a tapered tip, wherein the first fastener further comprises a first expansion nut secured around the tapered tip of the first screw, wherein the second fastener further comprises a second expansion nut secured around the tapered tin of the second screw, wherein the first expansion nut and the second expansion nut each comprise a sleeve flange, a plug and a threaded insert, wherein the threaded insert is longitudinally inserted into the plug, wherein the sleeve flange comprises a sleeve flange orifice aligned with the threaded insert, wherein the tapered tip of the first screw and the tapered tip of the second screw are respectively recessed within the sleeve flange of the first expansion nut and the sleeve flange of the second expansion nut in a first position, wherein the tapered tip of the first screw and the tapered tip of the second screw respectively extend out from the sleeve flange of the first expansion nut and the sleeve flange of the second expansion nut in a second position, and wherein the sleeve flange of the first expansion nut and the sleeve flange of the second expansion nut and the tapered tip of the first screw and the tapered tip of the second screw respectively engage a wall of the pipe in the second position.

16. The guard of claim 14, further comprising a third fastener and a fourth fastener, wherein the third fastener comprises a third screw extending through a third threaded hole in the first brace, wherein the fourth fastener comprises a fourth screw extending through a fourth threaded hole in the second brace, wherein the first threaded hole and second threaded hole are respectively positioned on the first brace and the second brace between the bracket and the flange, and wherein the third threaded hole and the fourth threaded hole are respectively positioned on the first brace and the second brace between the bracket and the plate.

17. A guard for inserting into an end of a pipe and securely connecting to an interior sidewall of the pipe, comprising:
a flange comprising a top side and a bottom side, wherein the bottom side contacts an opening at the end of the pipe;
a plate having at least one aperture, wherein the plate is positioned within the pipe;
a pair of braces connected to the flange at a proximal end and connected to the plate at a distal end, wherein the pair of braces are spaced opposite from each other, and wherein each of the pair of braces comprises a pair of threaded holes and a longitudinal axis substantially parallel with a central axis extending through a first center of the flange and a second center of the plate;
a first pair of screws respectively extending through the pair of threaded holes in a first brace in the pair of braces, wherein a first screw and a second screw in the first pair of screws each comprise a tapered end removably engaged with the interior sidewall of the pipe, and wherein one of the first screw and the second screw in the first pair of screws is closer to the flange than the other of the first screw and the second screw in the first pair of screws;
a second pair of screws respectively extending through the pair of threaded holes in a second brace in the pair of braces, wherein a first screw and a second screw in the second pair of screws comprises a tapered end removably engaged with the interior sidewall of the pipe at a position between the flange and the plate and substantially opposite from the first pair of screws, and wherein one of the first screw and the second screw in the second pair of screws is closer to the flange than the other of the first screw and the second screw in the second pair of screws; and
a bracket connecting the pair of braces at a location between the flange and the plate, wherein the location is situated between the first screw and the second screw in the first pair of screws and the second pair of screws, and wherein the bracket is substantially perpendicular to the longitudinal axis of each one of the pair of braces.

18. The guard of claim 17, further comprising a screen seated on the plate, a center plate aperture, and a screw connecting the screen to the plate, and wherein the center plate aperture is aligned at the second center of the plate.

19. The guard of claim 18, wherein the at least one aperture in the plate comprises an aperture diameter, wherein the center plate aperture comprises a center plate aperture diameter, wherein the aperture diameter is greater than the center plate aperture diameter, and wherein the aperture diameter is approximately 0.5 inches.

20. The guard of claim 18, wherein the first brace and the second brace are spaced a distance radially inward from a perimeter of the plate.

* * * * *